US010268730B2

United States Patent
Kowalski et al.

(10) Patent No.: US 10,268,730 B2
(45) Date of Patent: Apr. 23, 2019

(54) FOCUS-DRIVEN USER INTERFACE (75) Inventors: Vincent Joseph Kowalski, Houston, TX (US); Ashish Arora, Austin, TX (US)

(73) Assignee: BMC Software, Inc., Houston, TX (US)

( * ) Notice: Subject to any disclaimer, the term of this patent is extended or adjusted under 35 U.S.C. 154(b) by 1119 days.

(21) Appl. No.: 13/018,084

(22) Filed: Jan. 31, 2011

(65) Prior Publication Data

US 2012/0198373 A1 Aug. 2, 2012

(51) Int. Cl.
*G06F 3/048* (2013.01)
*G06F 17/30* (2006.01)

(52) U.S. Cl.
CPC .................. *G06F 17/3053* (2013.01)

(58) Field of Classification Search
CPC .................. G06F 8/38; G06F 9/4443
USPC .................. 715/767; 717/104, 106
See application file for complete search history.

(56) References Cited

U.S. PATENT DOCUMENTS 6,996,800 B2 * 2/2006 Lucassen et al. ............. 717/106
2005/0234993 A1 * 10/2005 Ordille .................. G06F 17/248
2006/0004891 A1 * 1/2006 Hurst-Hiller ..... G06F 17/30646

* cited by examiner

*Primary Examiner* — Matthew Ell
*Assistant Examiner* — Mohamed Abou El Seoud
(74) *Attorney, Agent, or Firm* — Brake Hughes Bellermann LLP (57) ABSTRACT

Systems, methods and computer readable media for implementing a Focus-Driven User Interface using a Focus-Driven MVC architecture are described. The Focus-Driven MVC architecture builds on the traditional MVC framework, adding a Focus component between the Controller and Model components. The Focus component implements Focus Logic to handle Focus-Driven features. The Focus component may receive access commands or requests from the Controller, relay those commands to the Model and, in response, obtain data from the Model. The Focus Logic applies rules to the data, determines relevancy rankings for the given property, and sends the processed data to the Controller which, in turn, may update the user interface with the processed data.

18 Claims, 7 Drawing Sheets

FIG. 1 (PRIOR ART)

Stock Portfolio
XOM
MSFT
T
BAC            >      Price     12.03
AA                    Volume    5 M
CVX                   %Vo Change +211%
                      more...

FIG. 2A

Stock Portfolio
XOM            >      Price     69.78
MSFT                  Support   66.54
T                     Resistance 72.33
BAC                   10 Day MA  67.77
AA                    50 Day MA  66.43
CVX                   200 Day MA 64.01 more...

FIG. 7

FOCUS-DRIVEN USER INTERFACE

BACKGROUND

This disclosure relates generally to the field of computing. More particularly, but not by way of limitation, this disclosure relates to a technique for providing a Focus-Driven User Interface using a new design pattern.

In a computer software application environment, some level of automation in the user interface is sometimes necessary to help users get to what they want to do quickly. Prior art user interface design achieves some automation based either on the pattern of use or on objects in the view. One such example is Microsoft's PowerPoint®. (POWERPOINT is a registered trademark of the Microsoft Corporation.) A PowerPoint application shows most recently opened documents in a list, assuming that those documents are the ones the user is most likely to re-visit. This is an example of automation based on a pattern of use. A PowerPoint application also adjusts to fit content to a screen by automatically adjusting the font size of text so that it can all fit on one screen. This is an example automation of the user interface that works on specific objects in the view (the text in the text box). However, these automations in user interface are constrained to a limited list, and the list does not change based on the data that is encountered.

There is a need, therefore, for a simple, elegant mechanism to implement a focus-driven user interface which updates the user interface based on the data that is encountered.

SUMMARY

Various embodiments disclose systems, methods and computer readable media for implementing a focus-driven user interface using a Focus-Driven MVC design pattern. The Focus-Driven MVC design pattern builds on traditional Model-View-Controller (MVC) framework, adding a Focus component between the Controller and the Model components. The Focus component comprises a set of rules, algorithms, and/or heuristics. The Focus component takes access commands or requests from the Controller, retrieves data from the Model, applies rules, algorithms, and/or heuristics to the retrieved data, determines relevancy rankings of attributes, and sends the processed data to the Controller to update the user interface.

In another embodiment, a Focus-Driven User Interface implementation system is disclosed that includes a processor, a storage subsystem coupled to the processor, and a software program, application or module stored in the storage subsystem, comprising instructions that when executed by the processor cause the processor to perform one of the methods described above.

In still another embodiment, a non-transitory computer readable medium is disclosed wherein the non-transitory computer readable medium (i.e., a program storage device) has instructions for causing a programmable control device to perform one of the methods described above.

In yet another embodiment, a networked computer system is disclosed that includes a plurality of computers communicatively coupled, at least one of the plurality of computers programmed to perform at least a portion of a method described above wherein the entire method is performed collectively by the plurality of computers.

DETAILED DESCRIPTION

Various embodiments disclose systems, methods and computer readable media that provide a Focus-Driven User Interface implementation using a new design architecture: Focus-Driven MVC architecture. The Focus-Driven MVC architecture builds on the traditional Model-View-Controller (MVC) framework, adding a Focus component between the Controller and the Model components. The Focus component includes Focus Logic to handle the Focus-Driven features. The Focus Logic comprises a set of rules, algorithms, and/or heuristics. In one embodiment, the Focus component receives access commands or requests from the Controller, relays the access commands or requests to the Model, and retrieves data from the Model. The Focus component applies rules to the data, determines relevancy rankings for a given property in the data, and sends the processed data to the Controller. The Controller in turn updates the user interface with the processed data.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
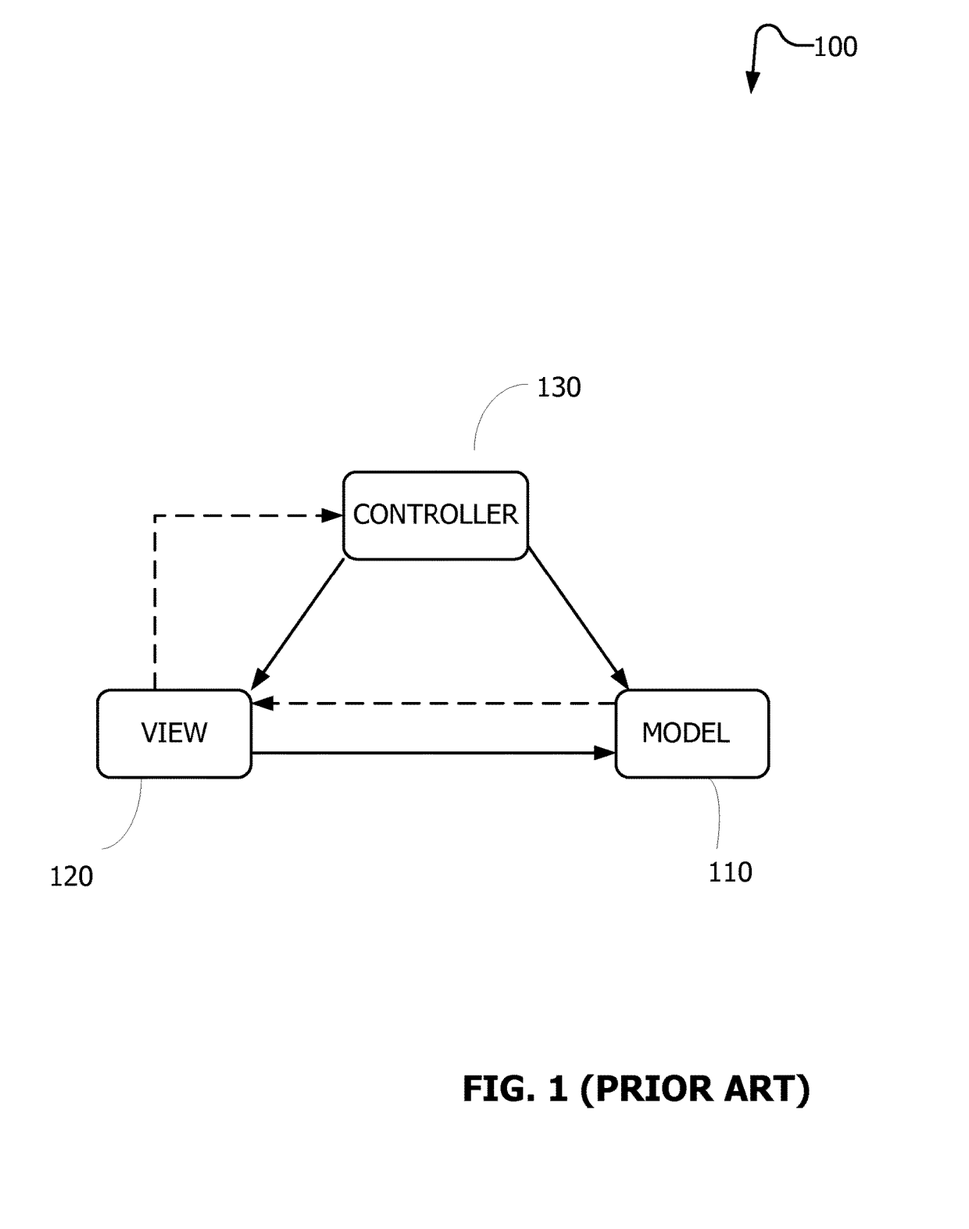
FIG. 1 illustrates an example MVC architecture.

Most current user interface software is implemented based on the Model-View-Controller (MVC) architecture. FIG. 1 illustrates the basic MVC architecture. As shown, MVC architecture 100 includes three components: Model

110, View 120 and Controller 130. The MVC architecture has benefited applications with Graphical User Interfaces (GUIs) for many years due to its separation of responsibilities in the Model, View and Controller components.

Model component 110 is a domain specific representation of the data on which the application operates. Illustrative Model components include, but are not limited to, files, DBMS, live data feeds, etc. View component 120 is the user interface presented to the user, in which the data from Model 110 is rendered in a form suitable for interaction. Illustrative View components include, but are not limited to, menus, graphs, dialogs, etc. Multiple Views can exist for a single Model for different purposes. Controller 130 includes application logic which processes and responds to events, typically user actions, and may invoke changes on Model 110 and View 120. When a user interacts with the user interface (View), Controller 130 handles an input event from the user interface via an event handler. Controller 130 then accesses Model 110 to retrieve needed data, and sends the retrieved data to View 120. The user interface is then updated to reflect the returned data.

As discussed above, the traditional MVC architecture separates responsibilities between the Model, View and Controller components. This allows the development of all kinds of components such as windows, menus, dialogs and data sources which are: re-usable, standard and consistent. There are several advantages for using the MVC architecture: (1) View component 120 needs no knowledge of Model 110 or Controller 130; (2) Model component 110 needs no knowledge of View 120 or Controller 130; (3) only Controller 130 needs knowledge of other components, application logic is implemented in Controller 130; (4) data providers need not consider application logic, instead only supplying standard interfaces, thereby enhancing the loose coupling between the application and the data source. In accordance with the traditional MVC design, View and Model components may be implemented to be reusable in a variety of applications. As a result, users may experience the same look-and-feel across many applications.

In a Focus-Driven User Interface, only the information with high relevancy to the user's request should be displayed, hiding those attributes that are less important. The user application may have a long list of properties/attributes associated with a given object in a user interface. The number of properties may be in the dozens, in some cases, even hundreds. It would be cumbersome to simply provide the whole list of properties to the user, letting the user scroll or search through the list.

Figure 2A:
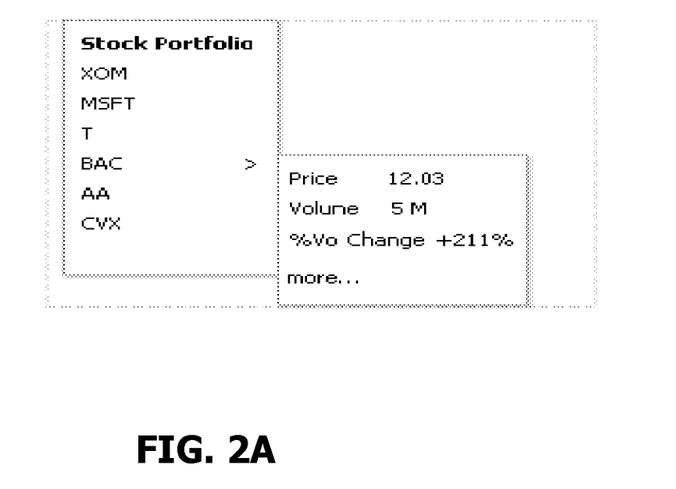
FIGS. 2A and 2B illustrate an example Focus-Driven User Interface.
Figure 2B:
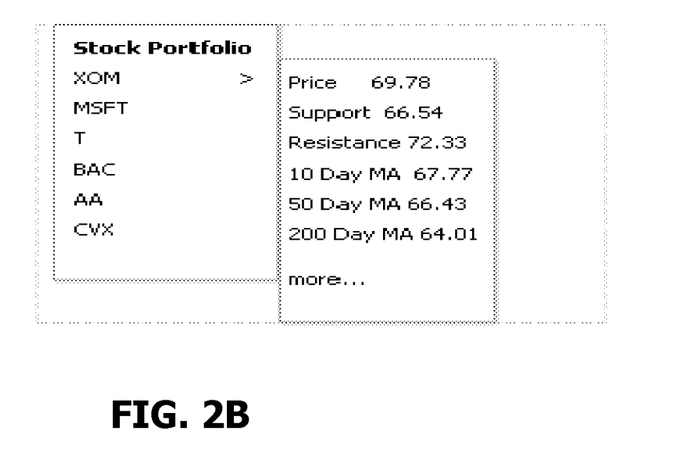

FIG. 2 illustrates an example Focus-Driven User Interface: trading tools for a stock trader. There are dozens or even hundreds of indicators for each stock, for example, a stock may have the following properties: price change since last close, today's volume, change in volume, P/E ratio, Beta, relative strength index, volatility index, price relative to 10/20/50/200 day moving averages, next support level, next resistance level, stochastics, etc. For a stock trader, different indicators may be relevant for different stocks. For example, stock BAC may have had a huge increase in volume due to the news that a new CEO has been appointed. In this case, it would be appropriate to display the volume change indicator in the user interface for stock BAC, as shown in FIG. 2A. In another example, price for stock XOM may have just moved above its resistance and its 10-day moving average. In this case it would be appropriate to highlight these indicators in the user interface for stock XOM, as shown in FIG. 2B.

A Focus-Driven User Interface involves the determination of relevancy for a set of query results. This relevancy determination enables the user interface to present to the user only those results that the user may find interesting or important; filtering or suppressing other irrelevant or less relevant results.

Unfortunately, strict adherence to the traditional MVC framework is contradictory to the Focus-Driven User Interface approach. As described above, View component 120 in a traditional MVC architecture has no knowledge of Model 110 or Controller 130. All logic to manipulate View 120 is implemented in Controller 130. In order to solve the problem of introducing Focus-Driven features into an MVC Framework, some different approaches may be taken.

In one embodiment, View components in an MVC architecture may be extended to include Focus-Driven features. This may be implemented by sub-classing existing user interface View components and then adding the Focus-Driven features into the sub-class definitions. Implementation in accordance with this embodiment can fulfill the Focus-Driven requirement in the user interface. The problem with this approach is that the View component now becomes "polluted" with application logic. In addition, because the Focus-Driven behavior gets encoded into the implementation of the View component, its re-use can be greatly limited. Every time a new Focus Logic is needed, another subclass of the View component would have to be created. There would be as many sub-classes as applications needing Focus-Driven features. Thus this solution does not scale very well for large sets of Focus-Driven requirements.

In another embodiment, the Focus-Driven features may be implemented into the Controller component of an MVC architecture. The Controller component may include logic for Focus-Driven capabilities. The implementation according to this embodiment has several advantages: it's in keeping with the MVC framework; the View component does not need to change; and the Model component does not need to change. However, there exist some disadvantages with this approach. Since Focus Logic is implemented in the Controller component, it may not be reused. Because the Controller component contains application logic specific to the Focus-Driven features, it may become complicated and difficult to maintain. Hence, each Focus-Driven user interface may become a one-off application, and the cost of development and maintenance may be high, and ultimately the quality of the code may be compromised.

Figure 3:
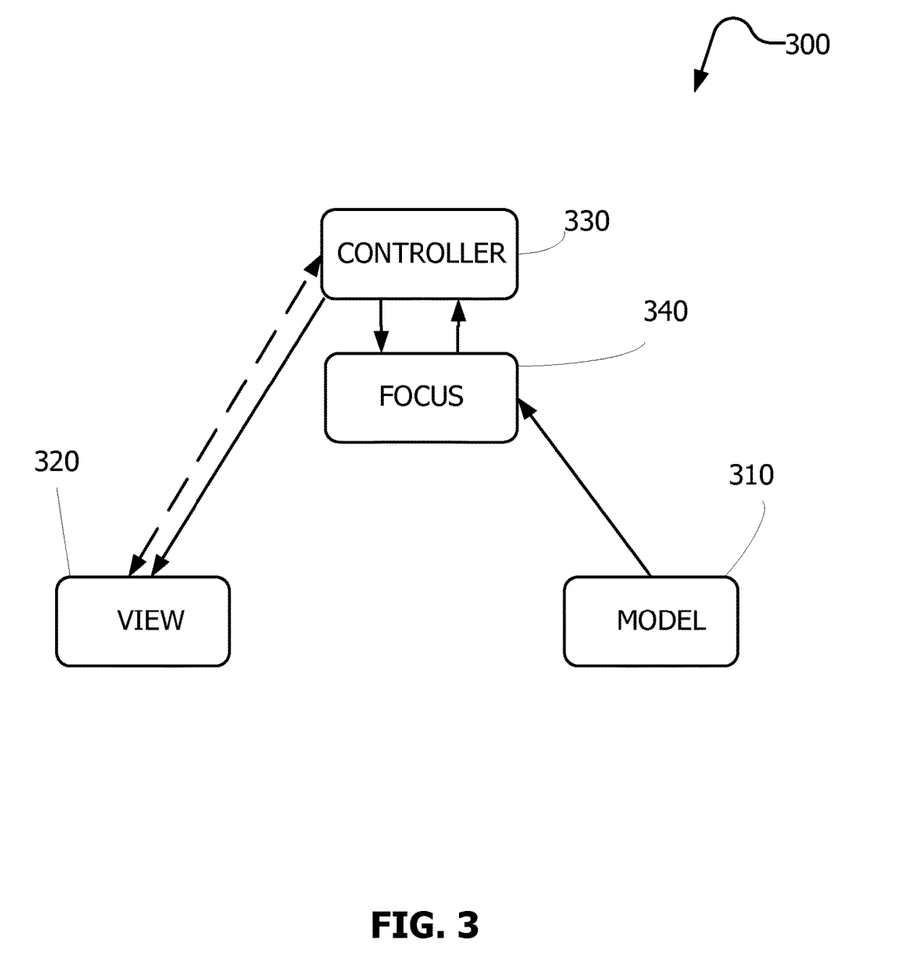
FIG. 3 illustrates an example architecture of the Focus-Driven MVC design pattern according to one embodiment.

FIG. 3 illustrates example Focus-Driven MVC architecture 300. Focus-Driven MVC architecture 300 may be used to implement the Focus-Driven User Interface. A Focus-Driven MVC architecture can be built upon the MVC architecture. A Focus-Driven MVC architecture has a new component added into the standard MVC architecture, Focus component 340. In accordance with one embodiment, instead of Controller component 330 accessing Model component 310 directly as in a traditional MVC architecture, Controller component 330 communicates with Model component 310 through Focus component 340. Focus component 340 receives access commands or requests from Controller component 330, and relays those commands or requests to Model component 310. Focus component 340 then takes data from Model component 310 (the data source), processes that data using logic specific to Focus-Driven features, such as a knowledge base of property data values, property taxonomy and relevancy rules, and recommends to Controller component 330 which properties to display and how to display them using View component 320. Each of Model component 310, View component 320, Controller component 330 and Focus component 340 may comprise one or more program modules, i.e., functional units.

Figure 4:
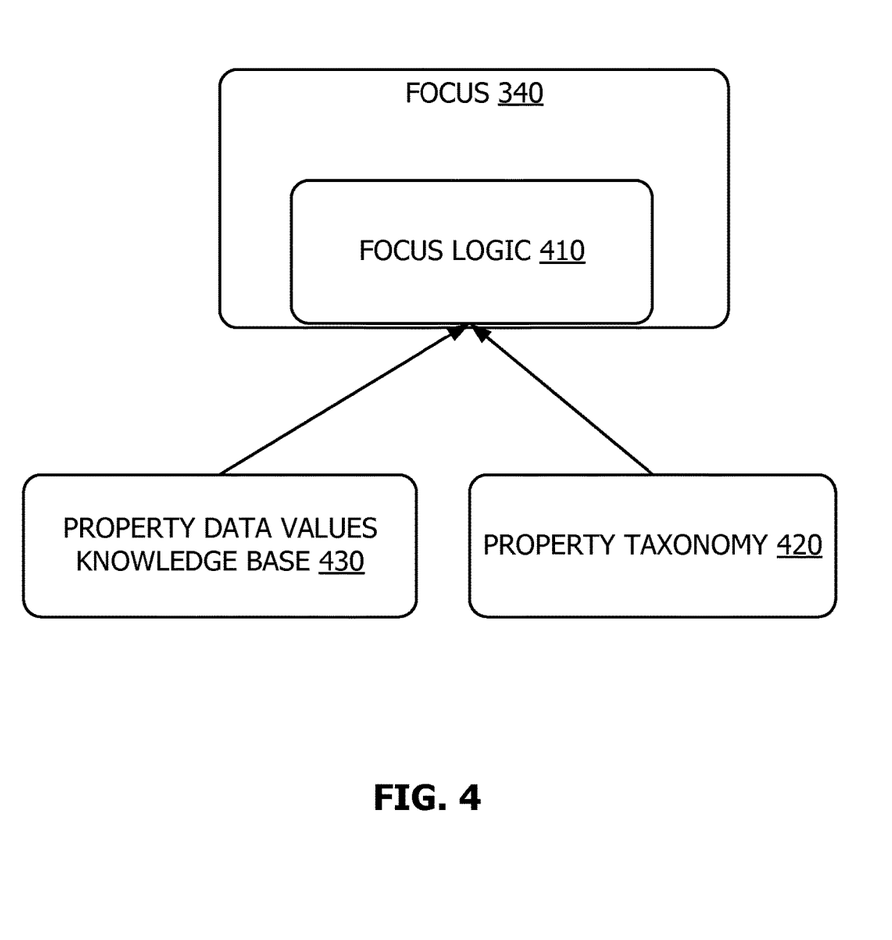
FIG. 4 illustrates a detailed design architecture of a Focus component of the Focus-Driven MVC design pattern according to one embodiment.

FIG. 4 illustrates an example detailed design of Focus component 340. As shown, Focus component 340 comprises Focus Logic 410 which implements algorithms/heuristics that do relevancy rankings of properties/attributes, and can be used to determine attribute relevancy. Property taxonomy 420 and property data value knowledge base 430 are used as input to Focus Logic 410 to determine the relevancy ranking of the attributes.

Property taxonomy 420 defines what the properties/attributes are, what is their organization, which properties are required, which properties are optional, etc. Properties may be grouped in categories. In one embodiment, one or more categories of properties may be configured to display to the user by default. Property data value knowledge base 430 comprises information about ranges of given property values, such as what is normal/expected, what is exceptional, etc. Property values may be context sensitive. Ranges of property values may vary depending on the data source of the property. Ranges of property values may also vary depending on other property values. Focus Logic 410 comprises logic used to determine the relevancy ranking, and can perform the relevancy determination based on information gathered from property taxonomy 420 and/or property data value knowledge base 430.

Figure 5:
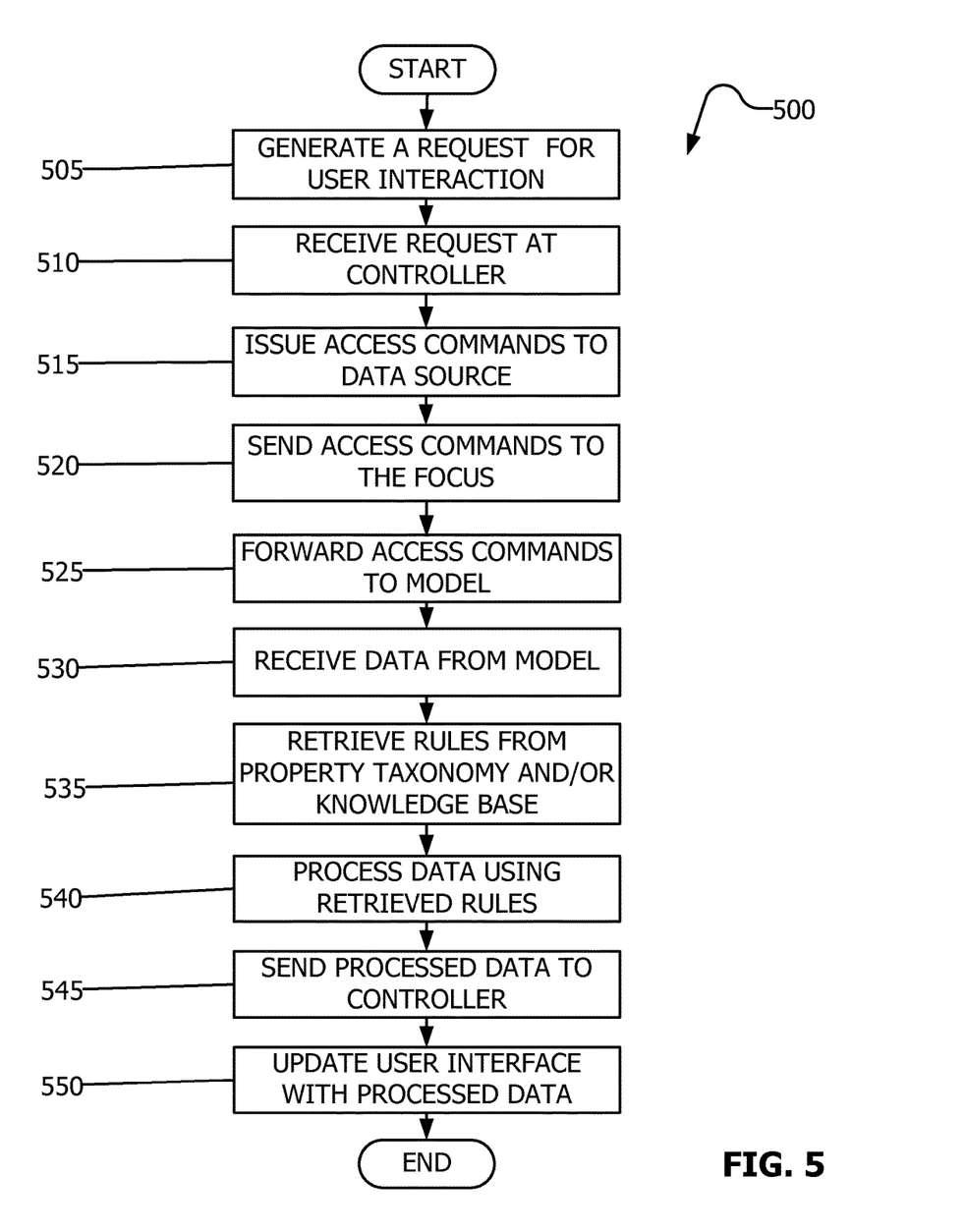
FIG. 5 illustrates, in flowchart form, a method for implementing a Focus-Driven User Interface using the Focus-Driven MVC design pattern according to one embodiment.

FIG. 5 illustrates example process 500 that utilizes a Focus-Driven MVC architecture. At block 505, when a user interacts with a user interface, a request is generated for user interaction. The request is received at the Controller component, block 510. After processing the request, the controller may issue access commands or requests to Model component 310, block 515, and sends the access commands or requests to Focus component 340, block 520. After Focus component 340 receives access commands or requests from the Controller, it relays the access commands or requests to Model component 330, block 525. The data is then retrieved from the Model component 330 using the access commands or requests. Focus 340 receives the retrieved data from Model 310, block 530. Focus 340 may then retrieve property definitions from property taxonomy 420, and property data value information from knowledge base 430, block 535, and process the data with the retrieved rules using Focus Logic 410 in Focus component 340, block 540. The processed data may then be sent to Controller 330, block 545. Controller 330 may then update the user interface with the processed data, block 550.

Referring back to FIG. 2, in order to accomplish the Focus-Driven UI as shown in FIG. 2, the stock trading tool may be implemented using the Focus-Driven MVC architecture described above. In this case, property taxonomy 420 and knowledge base 430 may be instantiated as follows:

Property taxonomy 420 may define the following rules: (1) property Price is always displayed; (2) other properties may be displayed contingent on their values; (3) if property "Volume Change" is displayed, then property "Volume" is also displayed; (4) if property "Support" is displayed, also display property "Resistance"; (5) if any of the "Moving Average" properties is displayed, display all "Moving Average" properties.

Property data value Knowledge Base 430 may specify: (a) if Volume Change ≥50%, display Volume Change; (b) if Price=Resistance (or Support), display Resistance (or Support); (c) If Price=Moving Average, display Moving Average.

If Property Taxonomy 420 and knowledge base 430 are defined as above, applying these rules to data retrieved from the Model components may result in a user interface as shown in FIG. 2.

In one embodiment, property taxonomy 420 and property data value knowledge base 430 for Focus Logic 410 may be independent of Controller Logic and can be stored as a data file/stream, such as a XML file or some other machine readable representation. These files for Focus Logic 410 may be defined or edited by the system administrator. The system administrator may also let the user define or edit the files. In one embodiment, a system administrator or a user may edit property taxonomy or knowledge base files at run-time.

Compared to the traditional MVC framework, the Focus-Driven MVC architecture described above: separates out Focus Logic 410, making it re-usable; makes the architecture/system data-driven: Data Value Knowledge Base 430 and Property Taxonomy 420 can be expressed in an XML file and kept separate from Focus Logic 410; Focus Logic 410 has no knowledge of the application domain; Model Component 310 does not need to be changed to include Focus 340; View Component 320 does not need to be changed to include Focus 340; and the Focus-Driven behavior can be changed dynamically at run-time.

Figure 6:
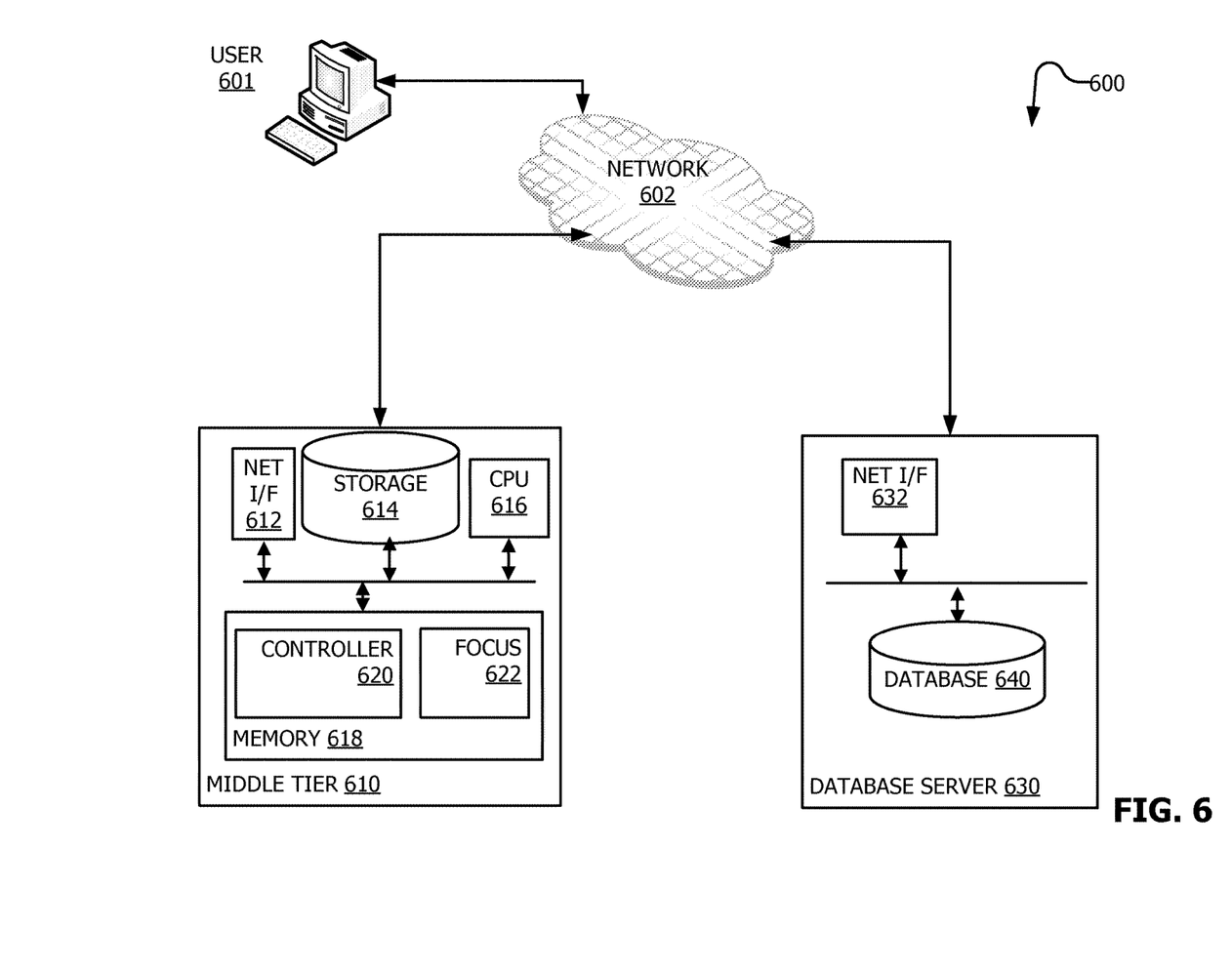
FIG. 6 illustrates an example system implementing Focus-Driven User Interface according to one embodiment.

FIG. 6 illustrates example system 600 that implements Focus-Driven user interface features using the Focus-Driven MVC architecture described above. System 600 includes middle tier 610 coupled to network 602, which provides connectivity between middle tier 610, one or more user nodes 601 and one or more database servers 630. Such connectivity is provided via each system's network interface (e.g., network interfaces 612 and 632). Example middle tier 610 includes Controller 620 and Focus 622, which are loaded into memory 618 and executed by CPU 616. Middle tier 610 also includes persistent storage device 614 (e.g., a hard disk drive), used to store configuration settings of Controller 620 and Focus 622. Middle tier 610 communicates with database server 630, retrieves data from database 640 and display data to user 601.

Controller 620 and Focus 622 comprise a collection of functional blocks. Each functional block may be implemented as a separate software component using, for example, any number of conventional programming languages including C, C++, Java®, and so on. (JAVA is a registered trademark of the Oracle Cooperation.) Furthermore, it will be appreciated by those skilled in the art that not every embodiment need require every functional block shown in FIG. 6, or may include additional functional blocks which have been left out of FIG. 6 to avoid obscuring the disclosed embodiment with unnecessary detail. Software code modules implementing the functional blocks and representing customization detection system 600 may reside and execute on a single machine, or may be distributed in some meaningful manner to reside and execute on multiple machines.

Figure 7:
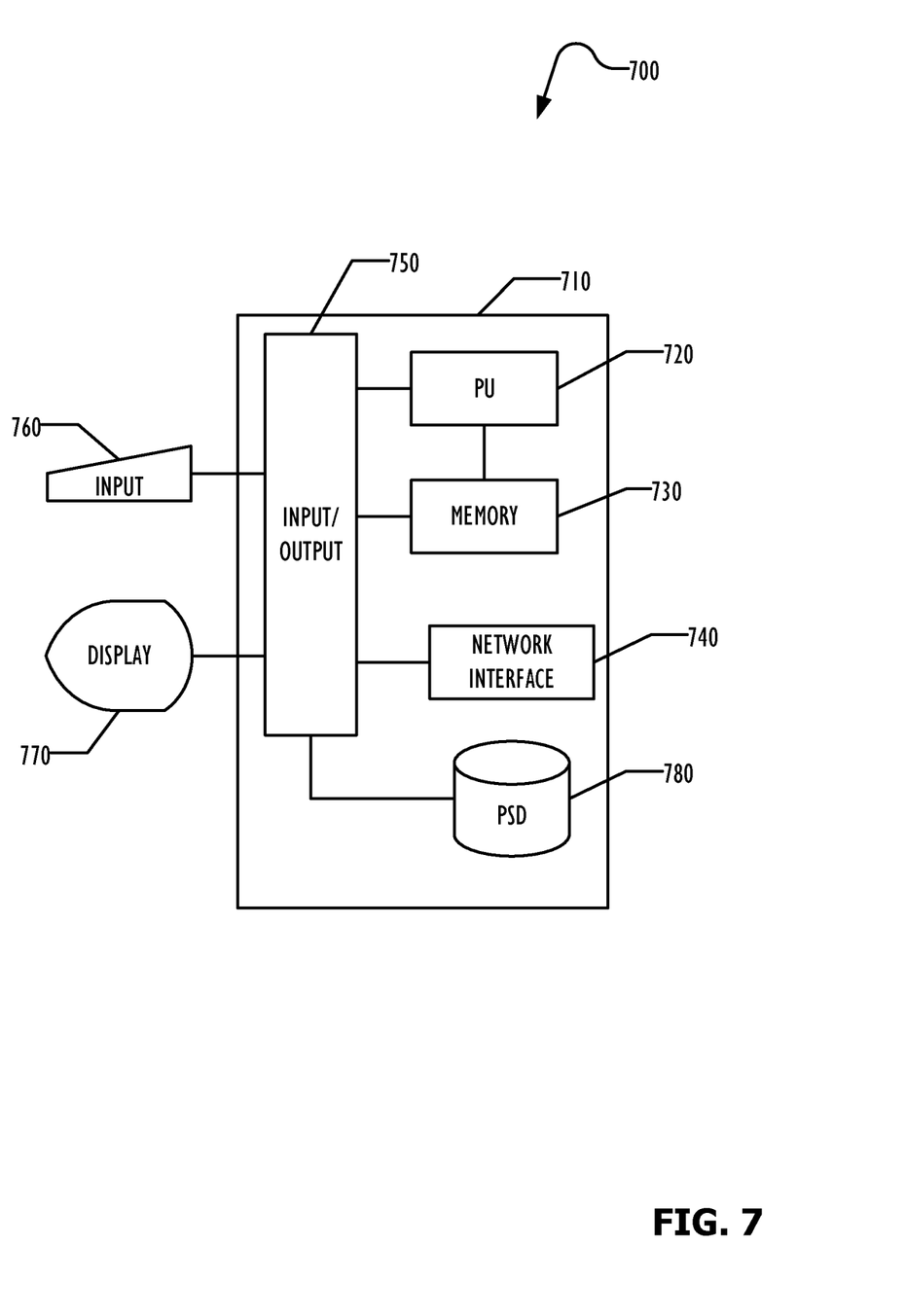
FIG. 7 illustrates, in block diagram form, an example computer system that may be utilized to implement various embodiments disclosed herein.

FIG. 7 shows example computer system 700. Example computer system 700 may be used as middle tier 610. Example computer system 700 comprises system unit 710 which may be optionally connected to input device 760 (e.g., keyboard, mouse, touch screen, etc.) and display 770. Program storage device (PSD) 780 is included within system unit 710. Also included within system unit 710 is network interface 740 for communication with other devices via a network (not shown). Network interface 740 may be included within system unit 710 or be external to system unit 710. In either case, system unit 710 may be communicatively coupled to network interface 740. Program storage device 780 represents any form of non-volatile storage including, but not limited to, all forms of optical and magnetic storage, including solid-state storage elements and removable media. Program storage device 780 may be used for storage of software to control system unit 710, data for use by computer system 700, or both.

System unit 710 may be programmed to perform methods in accordance with this disclosure (an example of which is shown in FIG. 5). System unit 710 comprises processor unit (PU) 720, input-output (I/O) interface 750 and memory 730. Processing unit 720 may include any programmable controller device including, for example, one or more members of the Intel Atom®, Core®, Pentium and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 730 may include one or more memory modules and comprise random access memory (RAM), read only memory (ROM), programmable read only memory (PROM), programmable read-write memory, and solid-state memory. One of ordinary skill in the art will also recognize that PU 520 may also include some internal memory including, for example, cache memory.

In addition, acts in accordance with the method of FIG. 5 may be performed by example computer system 700 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 6 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." Acts in accordance with FIG. 5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer-implemented method for providing a Focus-Driven User Interface within a Model-View-Controller (MVC) architecture, the method comprising:
    receiving, at a controller component, an event from a user interface;
    issuing, by the controller component, a request to a focus component based on the event;
    receiving, at the focus component, the request;
    forwarding, by the focus component, the request to a model component storing-a domain-specific representation of data of an application, wherein the controller component is communicatively coupled to the focus component, and the controller component is not directly communicatively coupled to the model component;
    receiving, at the focus component, at least a portion of the data from the model component in response to the request, the portion of data specifying that a plurality of items be rendered on the user interface, each item being visual data to be displayed to a user via the user interface;
    processing, at the focus component, the received portion of data to determine which items of the plurality of items to render on the user interface and which items of the plurality of items to not render on the user interface, wherein the processing step includes:
        retrieving focus driven information specific to the application from a database;
        inputting the focus driven information into logic of the focus component to determine a relevancy ranking in terms of which items of the plurality of items are more or less relevant to the user than others;
        identifying a subset of items to be rendered on the user interface among the plurality of items based on the relevancy ranking, the subset of items having a number of items less than the plurality of items; and
        determining a display arrangement for the subset of items;
    sending, by the focus component, the subset of items and the determined display arrangement to the controller component; and
    updating, by the controller component, the user interface by displaying the subset of items according to the determined display arrangement instead of all of the plurality of items on the user interface such that less relevant items are suppressed to the user, the less relevant items being items included within the plurality of items, but not included on the subset of items.

2. The computer-implemented method of claim 1, wherein the plurality of items includes an item having a data value such that the data value changes over time, wherein the processing step includes comparing the data value at a point in time to a threshold value and selecting the item for inclusion into the subset of items if the data value exceeds the threshold value such that the data value of the item is displayed on the user interface.

3. The computer-implemented method of claim 1, wherein the processing step includes selecting at least one, but less than all, of the plurality of items based on data values associated with the plurality of items such that inclusion within the subset of items is contingent on the data values.

4. The computer-implemented method of claim 1, wherein the plurality of items includes a first item and a second item, and identifying the subset of items includes selecting the second item for inclusion within the subset of items when the first item is selected for inclusion within the subset of items and not selecting the second item for inclusion within the subset of items when the first item is not selected for inclusion within the subset of items.

5. The computer-implemented method of claim 1, wherein the focus driven information is implemented in an extensible markup language (XML) file that is separate and independent from the logic of the focus component, the method further comprising:
dynamically changing a behavior of the focus component by modifying the focus driven information in the XML file.

6. A computer-implemented system for providing a Focus-Driven User Interface within a Model-View-Controller (MVC) architecture, the system comprising:
a controller component, including at least one processor, configured to receive an event from a user interface and issue a request based on the event;
a model component configured to store domain-specific representation of data of an application;
a view component configured to provide the user interface in which data from the model component is rendered for interaction with the user; and
a focus component, including the at least one processor, configured to receive the request, forward the request to the model component, and, in response to the request, receive at least a portion of the data from the model component, the portion of data specifying a plurality of items to be rendered on the user interface, each item being visual data to be displayed to a user via the user interface, wherein the controller component is communicatively coupled to the focus component, and the controller component is not directly communicatively coupled to the model component;
the focus component configured to process the received portion of data to determine which items of the plurality of items to render on the user interface and which items of the plurality of items to not render on the user interface, the focus component including logic, the focus component configured to:
retrieve focus driven information specific to the application from a database;
input the focus driven information into the logic of the focus component to determine a relevancy ranking in terms of which items of the plurality of items are more or less relevant to the user than others, the focus driven information being separate and independent from the logic of the focus component;
identify a subset of items to be rendered on the user interface based on the relevancy ranking, the subset of items having at least one, but less than all, of the plurality of items; and
determine a display arrangement for the subset of items;

the focus component configured to send the processed data, including the subset of items, to the controller component; and
the controller component configured to update the user interface with the processed data, including displaying the subset of items according to the determined display arrangement, instead of all of the plurality of items within the user interface object.

7. The computer-implemented system of claim 6, wherein the plurality of items includes an item having a data value such that the data value changes over time, and the focus component is configured to compare the data value at a point in time to a threshold value and select the item for inclusion into the subset of items if the data value exceeds the threshold value such that the data value of the item is displayed on the user interface.

8. The computer-implemented system of claim 6, wherein the focus component is configured to select at least one but less than all of the plurality of items based on data values associated with the plurality of items such that inclusion within the subset of items is contingent on their data values.

9. The computer-implemented system of claim 6, wherein the focus-driven information is implemented in an extensible markup language (XML) file separate from the logic, wherein a behavior of the focus component is dynamically changed at run-time by modifying the focus-driven information in the XML, file.

10. A non-transitory computer-readable medium storing instructions that when executed cause at least one processor to implement a Focus-Driven User Interface within a Model-View-Controller (MVC) architecture, the instructions comprising instructions to:
receive, at a controller component, an event from a user interface;
issue, by the controller component, a request to a focus component based on the event;
receive, at the focus component, the request;
forward, by the focus component, the request to a model component storing a domain-specific representation of data of an application, wherein the controller component is communicatively coupled to the focus component, and the controller component is not directly communicatively coupled to-the model component;
receive, at the focus component, at least a portion of the data from the model component in response to the request, the portion of data specifying a plurality of items to be rendered on the user interface, each item being visual data to be displayed to a user via the user interface;
process, at the focus component, the received portion of data to determine which items of the plurality of items to render on the user interface and which items of the plurality of items to not render on the user interface, wherein the instructions to process the received portion of data include instructions to:
retrieve focus driven information specific to the application from a database;
input the focus driven information into logic of the focus component to determine a relevancy ranking in terms of which of the plurality of items are more or less relevant to the user than others;
identify a subset of items for display among the plurality of items based on the relevancy ranking, the subset of items having a number of items less than the plurality of items; and
determine a display arrangement for the subset of items;

send, by the focus component, the subset of items and the determined display arrangement to the controller component; and update, by the controller component, the user interface by displaying the subset of items according to the determined display arrangement instead of all of the plurality of items on the user interface.

11. The non-transitory computer-readable medium of claim 10, wherein the instructions to process the received portion of data include instructions to select at least one, but less than all, of the plurality of items based on data values associated with the plurality of items such that inclusion within the subset of items is contingent on their data values.

12. The non-transitory computer-readable medium of claim 10, wherein the plurality of items includes a first item and a second item, and the instructions to identify the subset of items include instructions to select the second item for inclusion within the subset of items when the first item is selected for inclusion within the subset of items and not select the second item for inclusion within the subset of items when the first item is not selected.

13. The non-transitory computer-readable medium of claim 10, wherein the focus driven information is implemented in an extensible markup language (XML) file that is separate and independent from the logic.

14. The non-transitory computer-readable medium of claim 13, wherein the instructions include instructions to dynamically modify a behavior of the focus component at run-time based on receipt of a change to the focus driven information within the XML file.

15. The computer-implemented method of claim 1, wherein the focus driven information includes property taxonomy information and property data value information, the property taxonomy information including information that defines which items are required and which items are optional, the property data value information including information that defines ranges of data values for the plurality of items, including what data values are normal and what data values are exceptional.

16. The computer-implemented system of claim 6, wherein the focus driven information includes property taxonomy information and property data value information, the property taxonomy information including information that defines which items are required and which items are optional, the property data value information including information that defines ranges of data values for the plurality of items, including what data values are normal and what data values are exceptional.

17. The computer-implemented system of claim 6, wherein the logic of the focus component is configured to implement a heuristic algorithm to execute the relevancy ranking.

18. The non-transitory computer-readable medium of claim 10, wherein the focus driven information includes property taxonomy information and property data value information, the property taxonomy information including information that defines which items are required and which items are optional, the property data value information including information that defines ranges of data values for the plurality of items, including what data values are normal and what data values are exceptional.

* * * * *

UNITED STATES PATENT AND TRADEMARK OFFICE
CERTIFICATE OF CORRECTION

PATENT NO. : 10,268,730 B2
APPLICATION NO. : 13/018084
DATED : April 23, 2019
INVENTOR(S) : Kowalski et al.

Page 1 of 1

It is certified that error appears in the above-identified patent and that said Letters Patent is hereby corrected as shown below:

In the Claims

Column 8, Claim 1, Line 24, delete "storing-a" and insert -- storing --, therefor.

Column 10, Claim 9, Line 27, delete "XML, file." and insert -- XML file. --, therefor.

Signed and Sealed this
Twenty-sixth Day of May, 2020

Andrei Iancu
*Director of the United States Patent and Trademark Office*